United States Patent [19]
Ferguson

[11] Patent Number: 6,016,499
[45] Date of Patent: Jan. 18, 2000

[54] SYSTEM AND METHOD FOR ACCESSING A DIRECTORY SERVICES RESPOSITORY

[75] Inventor: Daniel T. Ferguson, Orem, Utah

[73] Assignee: Novell, Inc., Provo, Utah

[21] Appl. No.: 08/897,526

[22] Filed: Jul. 21, 1997

Related U.S. Application Data

[60] Provisional application No. 60/038,747, Feb. 20, 1997.

[51] Int. Cl.[7] .................................................. G06F 17/30
[52] U.S. Cl. .......................... 707/104; 707/102; 707/100; 707/1
[58] Field of Search .................................... 707/101, 104, 707/100, 10, 102, 1

[56] References Cited

U.S. PATENT DOCUMENTS

| | | | |
|---|---|---|---|
| 4,769,772 | 9/1988 | Dwyer | 707/2 |
| 4,930,071 | 5/1990 | Tou et al. | 707/4 |
| 5,212,787 | 5/1993 | Baker et al. | 707/101 |
| 5,257,366 | 10/1993 | Adair et al. | 707/4 |
| 5,410,675 | 4/1995 | Shreve et al. | 710/65 |
| 5,416,917 | 5/1995 | Adair et al. | 707/203 |
| 5,483,586 | 1/1996 | Sussman | 379/201 |
| 5,499,358 | 3/1996 | Navarez | 707/101 |
| 5,617,568 | 4/1997 | Ault et al. | 707/101 |
| 5,761,494 | 6/1998 | Smedley et al. | 707/4 |
| 5,761,499 | 6/1998 | Sonderegger | 707/10 |
| 5,812,653 | 9/1998 | Jodoin et al. | 379/205 |
| 5,857,190 | 1/1999 | Brown | 707/10 |
| 5,878,411 | 3/1999 | Burroughs et al. | 707/4 |
| 5,878,415 | 3/1999 | Olds | 707/9 |

OTHER PUBLICATIONS

John Cox, "Sun Promotes New API to forge JAVA–to–database Links", Computer Select, Network World v13 n8 p.12, Feb. 19, 1996.

David S. Linthicum, "The JDBC Connection", Computer Select, DBMS v9 n11 p.21.(3), Oct. 1996.

Doug Van Kirk, "Middleware Enhances Web", Computer Select, LAN Times v13 n5 p.45(1), Mar. 4, 1996.

Glyn Moody, "How to Integrate Database Servers with the Internet", Computer Weekly p.53 (1), May 30, 1996.

"Understanding ODBC and OLE", Microsoft Corporation (1997, 1997), no later than Feb. 12, 1997.

"Open DataBase Connectivity (ODBC)", ExperTelligence, Inc. (1996), no later than Feb. 12, 1997.

"ORACLE Rdb™ Press Releases and Announcements", Oracle Corporation (1995), no later than Feb. 12, 1997.

"Overview", no later than Feb. 12, 1997.

"ODBC search results", Microsoft Site Search Results, Microsoft Corporation (1997), no later than Feb. 12, 1997.

"Synergy ODBC Driver—Do You Need ODBC?", Synergex ODBC White Paper, May 1 1996.

"Accessing the World of Information: Open Database Connectivity (ODBC)", Microsoft Corporation (1995), no later than Feb. 12, 1997.

(List continued on next page.)

*Primary Examiner*—Anton W. Fetting
*Assistant Examiner*—Greta L. Robinson
*Attorney, Agent, or Firm*—Computer Law ++

[57] ABSTRACT

Methods and systems are provided for database-style access to a directory services repository stored on a computer network. A directory services application programming interface is controlled by a driver. The driver translates relational database language statements, such as ODBC-compliant SQL statements, into an executable API sequence that produces an API result. The driver also translates the API result into a relational database result. The repository may be a Novell Directory Services repository or an X.500 directory services repository. The invention maps an effective class of the repository to a table identified in the relational database language statement. Each object that is an instance of the effective class is mapped to a row in the table, and each attribute maps to a column of the table. As a result, the invention allows database tools such as report generators to work with the information stored in the repository.

69 Claims, 6 Drawing Sheets

OTHER PUBLICATIONS

"Developing Database Independent Applications with ODBC", Visigenic Software—ODBC White Paper, no later than Feb. 12, 1997.

"The JDBC(™) Database Access API", Sun Microsystems, Inc. (1996), no later than Jul. 14, 1997.

"Sun Microsystems Introduces JAVA Naming and Directory Interface API", Press Release, Mar. 10, 1997, Sun Microsystems, Inc. (1995–1997).

Network Working Group, Mar. 1991, RFC 1212, pp. 1–15.

SYSTEM AND METHOD FOR ACCESSING A DIRECTORY SERVICES RESPOSITORY

RELATED APPLICATIONS

This application is a continuation-in-part of commonly owned copending provisional patent application Ser. No 60/038,747 filed Feb. 20, 1997.

FIELD OF THE INVENTION

The present invention relates to a system and method for providing a relational database application program with at least partial access to a directory services repository. More particularly, the invention relates to an Open Database Connectivity driver that translates between Structured Query Language statements and a directory services repository interface.

TECHNICAL BACKGROUND OF THE INVENTION

Although computers generally make information more readily available, in some situations the way information is stored on a computer system may hinder access to the information. In particular, differences in how information is structured may cause problems when one tries to start using tools developed in one historic context to access or manipulate information which arose in a different context.

Relational databases are among the oldest and best understood structures in computer science. They were in use on mainframes long before client-server networks or the Internet became part of the information technology world. Relational databases are used by businesses to store and manipulate information on everything from inventory to payroll, by government agencies to track everything from taxes to building licenses, and by individuals for an equally wide variety of purposes. Dozens of popular relational database programs are commercially available.

Not surprisingly, many of the relational database programs available are not consistent with one another. Some attempts have been made to define standards, but they have not been entirely successful. Many, but not all, relational database tools accept at least a subset of some version of the database query language known as Structured Query Language ("SQL"). Many, but not all, relational database tools also conform to at least a subset of some version of the interface standard known as the Open Database Connectivity standard ("ODBC"). Access according to the ODBC standard is possible using various drivers, such as the PureJava JDBC driver (PUREJAVA and JDBC are trademarks of Sun Microsystems, Inc.).

The ODBC standard defines an interface which can be used by applications or other database tools to access a variety of databases. The interface makes each database appear (more or less) the same to a given database tool. This is accomplished by using different "driver" software for each different database. A "driver manager" is typically also provided. The driver manager helps pass information between a given database tool and the driver(s) for the database(s) being accessed by the tool.

Unlike relational databases, "directory service" structures are a relatively recent development in information technology. The need for directory services became clear only after computer networks became a prominent part of the information landscape and grew so large and complex that their administration required full-time attention from specialists. Directory services are sometimes referred to as "naming services."

A variety of directory service providers are now available to help administer both the location of network resources and the rights of network users to use those resources. Many, but not all, directory service tools conform at least in part with the X.500 directory services standard. One well-known directory service system includes NetWare Directory Services software commercially available from Novell, Inc. of Provo, Utah (NETWARE DIRECTORY SERVICES is a trademark of Novell, Inc.). As used herein, "Novell Directory Services" ("NDS") includes NetWare Directory Services and any other directory service commercially available from Novell, Inc.

In contexts other than the present one, a directory services repository is sometimes called a directory services "database." Both repositories and databases may be distributed, because that is mainly a matter of storage and locks for enforcing consistency, rather than a question of the basic internal structure. But "database" and "repository" are not interchangeable in the present context.

A repository supports naming services. Each repository is organized hierarchically, as one or more trees. Each object in a tree (except the root object) has exactly one parent. Objects may generally have children, which may inherit properties from their ancestor objects. Objects are instances of "classes," as described in detail below.

By contrast, "database" as used herein refers to a relational database. A given database may support any of a wide variety of commercial or personal activities. Each database is organized as a set of tables in which rows represent records and columns represent record fields. Certain fields may be found in multiple tables, and the values of these "key" or "index" fields are used to guide database searches. Database access and manipulation involve combining information from various tables into new combinations to obtain different views of the data.

In short, databases and repositories arose at different times to meet different needs, and have different structures and capabilities. There is no need to dwell further here on the details of relational database structure, SQL, or ODBC, as numerous references on those topics are widely available. Many computer science professionals have also taken at least one course in databases.

However, the details of directory service repositories are less familiar to many people, so they are summarized here. At least one NDS directory services provider includes a schema. The schema includes a set of "attribute syntax" definitions, a set of "attribute" definitions, and a set of "repository object class" definitions. The NDS software and a default NDS schema are described in Bierer et al., *NetWare 4 for Professionals*, ISBN 1-56205-217-9 ("NetWare 4"), pages 255–342. The terms "attribute" and "property" are used interchangeably in NetWare 4 and herein, as are the terms "attribute syntax" and "property syntax."

Each attribute syntax in the schema is specified by an attribute syntax name and the kind and/or range of values that can be assigned to attributes of the given attribute syntax type. Attribute syntaxes include, without limitation, Case Exact String (case-sensitive string), Case Ignore List (case-insensitive string list), E-Mail Address, Net Address (valid addresses include IPX and AppleTalk), Path, and Stream. Attribute syntaxes correspond roughly to data types such as integer, float, string, file, stream, or Boolean, or to collections of these types, in conventional programming languages.

Each attribute in the schema has certain information associated with it. Each attribute has an attribute name and an attribute syntax type. The attribute name identifies the attribute, while the attribute syntax limits the values that are assumed by the attribute. For instance, the default NDS schema includes an attribute of syntax type integer having the name "supported connections" which specifies the number of concurrent connections a file server allows.

Each attribute may also have associated with it any or all of the following flags: Non-removable, Hidden, Public Read, Read Only, Single-Valued, Sized, and String. The general meanings of these flags are familiar to those of skill in the art. If the Sized flag is set for a given attribute, then upper and lower bounds (possibly including No Limit) are imposed on values to be held by that attribute.

Each repository object class in the schema also has certain information associated with it. Each repository object class has a class name which identifies it, a set of super classes that identifies the other classes from which this class inherits attributes, and a set of containment classes that identifies the classes permitted to contain instances of this class.

Each repository object class also has a container flag and an effective flag. The container flag indicates whether the class is a container class, that is, whether it is capable of containing instances of other repository object classes. The effective flag indicates whether instances of the class (objects) can be defined. Non-effective repository object classes are used only to define attributes that will be inherited by other classes, whereas effective classes are used to define inheritable attributes, to define instances, or to define both.

In addition, each repository object class groups together certain attributes. The naming attributes of a repository object class are those attributes that can be used to name objects belonging to the class. The mandatory attributes of a repository object class are those attributes that must exist in each valid instance of the class and/or become mandatory attributes of classes which inherit from the class. The optional attributes of a repository object class are those attributes that may, but need not, exist in each valid instance of the class. Optional attributes of a parent class become optional attributes of a child class which inherits from the parent class, unless the attributes are mandatory in some other parent class from which the child inherits, in which case they are also mandatory in the child.

A repository object is an instance of a repository object class. Different repository objects of the same class have the same mandatory attributes but may have different current values in their corresponding mandatory attributes. Different repository objects of the same class may have different optional attributes, and/or different current values in their corresponding optional attributes.

A repository object may be identified in various ways. According to the most visible method, users concatenate legible mnemonic names to create a distinguished name of the type familiar to users of Novell NetWare software. A "common name" forms the terminal part of a distinguished name, with the rest of the distinguished name providing a context for the common name so that different objects can have the same common name.

Networking and directory service software may also use identifiers not typically seen by users. For instance, directory services software translates between distinguished names and common names, on the one hand, and non-mnemonic internal identifiers such as GUIDs, tuned names, tree names, and replica identifiers, on the other hand.

The directory services provider also includes a directory services interface library which provides access to a repository and possibly to the schema as well. The schema may be an API-extensible schema in that the attributes and object classes found in the schema can be altered through a schema Application Program Interface ("API") without direct access to the source code that implements the schema. In some embodiments the directory services interface library includes tables or commands stored in a file which is read by the schema during its initialization and when repository objects are created, thereby defining the available attributes and classes.

The directory services interface library includes a set of routines that are available to other code to access and modify the repository and possibly also the schema. One implementation of the directory services interface library includes an NWDSxxx( ) library that is commercially available as an API from Novell, Inc. of Orem, Utah. The NWDSxxx( ) library is so named because the names of functions and data types defined in the library typically begin with "NWDS," an acronym for "NetWare Directory Services." It would be a straightforward task for one of skill in the art to access the NWDSxxx( ) API from code written in C or C++ or a similar programming language. Another implementation of the directory services interface library includes the Java Naming and Directory Interface ("JNDI") API. (JNDI is a trademark of Sun Microsystems, Inc.).

The directory services repository contains repository objects that are defined according to the schema and the particulars of the network. These objects typically represent resources of the network. The repository is a "hierarchical" repository because the objects in the repository are connected in a hierarchical tree structure. Objects in the tree that can contain other objects are called "container objects" and must be instances of a container object class.

The repository may also be a "synchronized-partition" repository. Such a repository is typically divided into two or more non-overlapping partitions. To improve the response time to repository queries and to provide fault-tolerance, a replica of each partition is physically stored on one or more file servers in the network. The replicas of a given partition are regularly updated by the directory services provider through an automated synchronization process, thereby reducing the differences between replicas caused by activity on the network.

Although directory services are extremely useful, access to the information in a repository is currently limited. The NDS API and other known directory service interfaces do not accept SQL and do not conform with ODBC. Thus, tools such as report generators configured for databases cannot be readily used to access or process the information in a repository.

Yet another source of information available on some servers is the NetWare Core Protocol API ("NCP API"), which provides access to capabilities such as load and efficiency statistics, connection making or breaking, file and directory handling, printing, security enforcement, and drive mapping changes. The NCP API does not accept SQL and does not conform with ODBC.

Thus, it would be an advancement in the art to provide a novel system and method for making the information in a directory service repository accessible to tools that were designed and written to access or manipulate relational databases.

It would be an additional advancement to provide such a system and method which make repository information accessible to tools that use SQL and/or conform with ODBC.

It would also be an advancement to provide such a system and method which makes the information stored by NCP software available in a relational database format.

Such a method and system are disclosed and claimed herein.

BRIEF SUMMARY OF THE INVENTION

The present invention provides methods and systems for database-style access to a directory services repository which is stored on a server computer in a computer network. In one embodiment, a system according to the invention includes a directory services application programming interface, also known as the API, and a suitable driver. The API includes at least one callable element that is capable of accessing a component of the repository in response to being called. The driver is capable of translating a relational database language statement, such as an ODBC-compliant SQL statement, into an executable API sequence that includes a call to the callable element and produces an API result. The driver is also capable of translating the API result into a relational database result.

The repository may be a Novell Directory Services repository, in which case the API preferably includes a Novell Directory Services API. The API may include a Lightweight Directory Access Protocol ("LDAP") API. If the repository is an X.500 directory services repository, the API includes a corresponding X.500 API. As used herein, an X.500 repository is a directory services repository which conforms with the X.500 standard.

One embodiment maps an effective class of the repository to a table identified in the relational database language statement. Each object that is an instance of the effective class is mapped to a row in the table, and each attribute maps to a column of the table. The table may also be implemented and viewed as a related collection of tables. This mapping allows database tools such as report generators to work with the information stored in the repository.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a system and method for providing relational database applications with access to a directory services repository which is stored on a computer network or other computer system. The network may be a local network, wide area network, and/or the Internet; "Internet" as used herein includes variations such as a private Internet, secure Internet, value-added network, or intranet. The computers connected by the network or otherwise present in the system may be workstations, laptop computers, disconnectable mobile computers, file servers, or a combination thereof. The network may include one or more LANs, wide-area networks, Internet servers and clients, intranet servers and clients, or a combination thereof.

Figure 1:
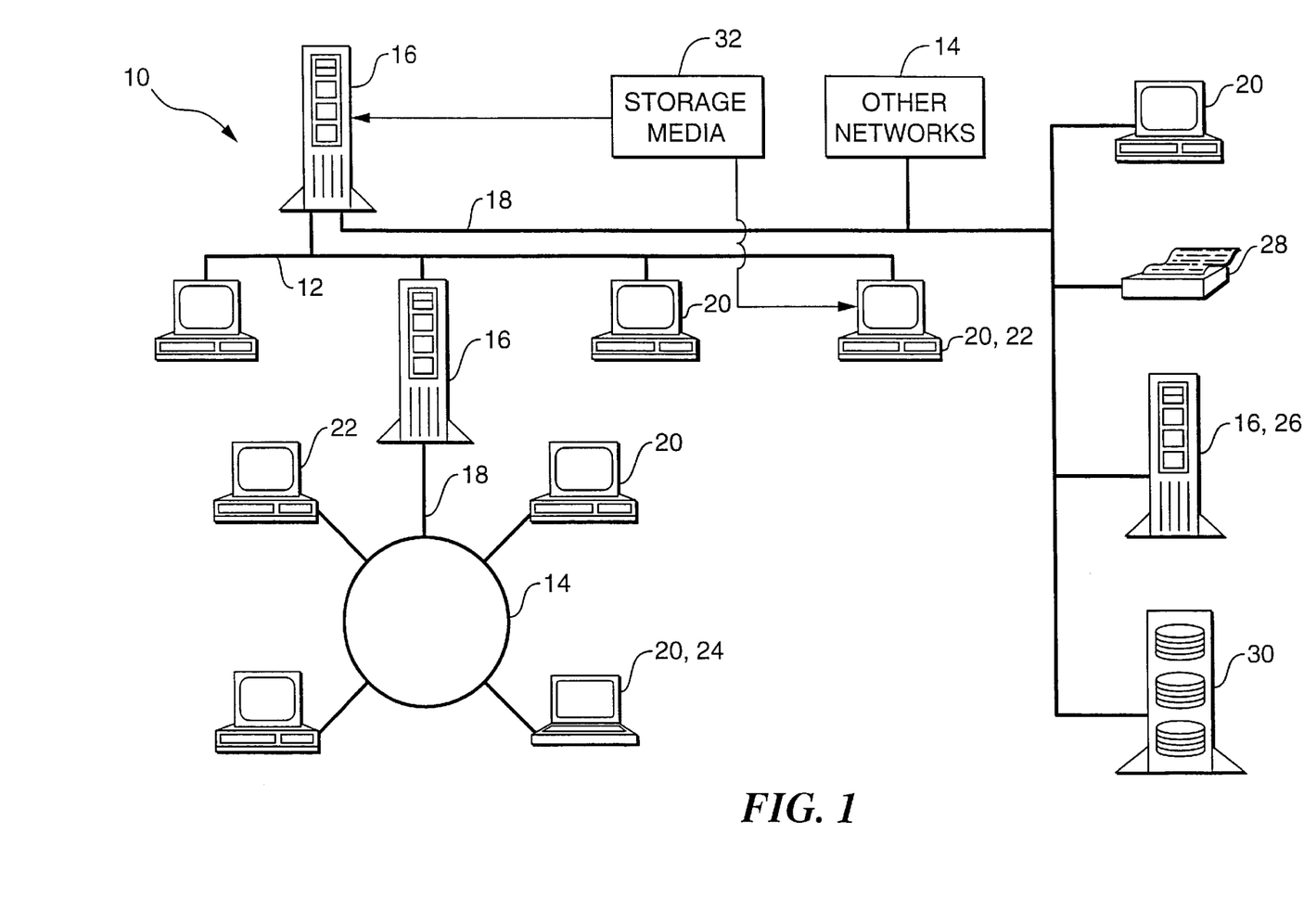
FIG. 1 is a diagram illustrating a computer network which is one of many networks suitable for use with the present invention.

One of the many computer networks suited for use with the present invention is indicated generally at 10 in FIG. 1. In one embodiment, the network 10 includes Novell NetWare® network operating system software (NETWARE is a registered trademark of Novell, Inc.) and Novell's NetWare Directory Services software. In alternative embodiments, the network includes NetWare Connect Services, VINES, Windows NT, Windows 95, LAN Manager, or LANtastic network operating system software and an implementation of a repository according to the X.500 protocol (VINES is a trademark of Banyan Systems; NT, WINDOWS 95, and LAN MANAGER are trademarks of Microsoft Corporation; LANTASTIC is a trademark of Artisoft). The network 10 may include a local area network 12 which is connectable to other networks 14, including other LANs or portions of the Internet or an intranet, through a gateway or similar mechanism.

The network 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory services providers or name servers, as software component servers, or as a combination thereof. The servers 16 may be uniprocessor or multiprocessor machines. The servers 16 and clients 20 each include an addressable storage medium such as random access memory and/or a non-volatile storage medium such as a magnetic or optical disk.

Suitable network clients 20 include, without limitation, personal computers 22, laptops 24, and workstations 26. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the network 10. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform directory service repository access steps of the present invention substantially as described herein.

Figure 2:
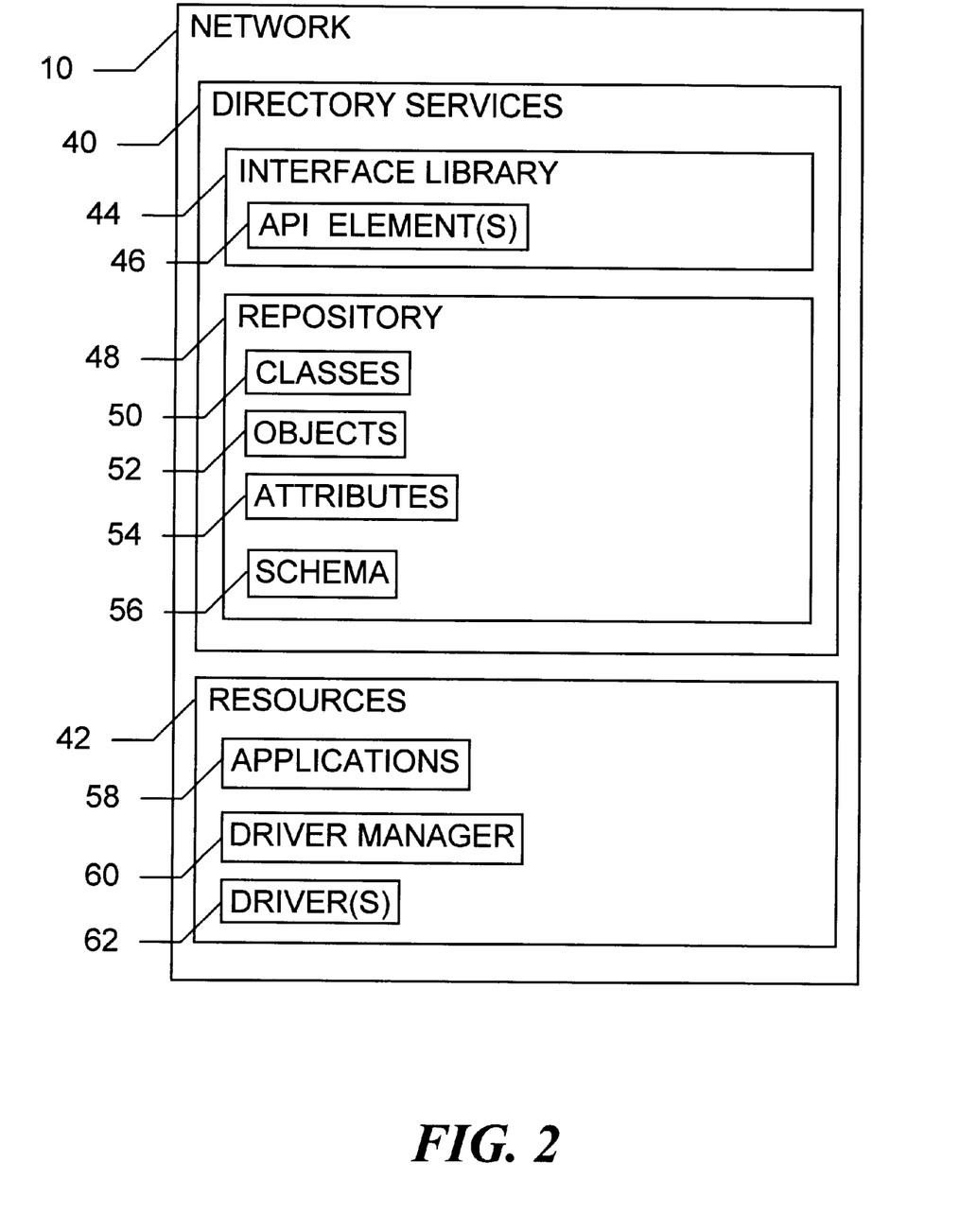
FIG. 2 is a diagram illustrating a directory services repository and other components of the network shown in FIG. 1.

FIG. 2 further illustrates the network 10. The network 10 includes a directory services provider 40 and various resources 42. The directory services provider 40 includes an interface library 44, such as the NDS interface library discussed above. The interface library 44 includes at least one callable API element 46, such as the functions in the NWDSxxx( ) library. The API element(s) 46 together form a directory services application programming interface, also known as the API.

The directory services provider 40 also includes a repository 48, such as the NDS repository discussed above. The repository 48 thus includes at least one effective class 50, at least one object 52 which is an instance of the effective class 50, and at least one attribute 54. In some embodiments, the repository 48 also includes an explicit schema 56, as discussed above. In other embodiments the schema is implicit and expressed only in the structure of the classes 50, objects 52, and attributes 54.

The directory services provider 40 may be one of the more important resources available on the network 10, but for clarity of illustration the provider 40 is viewed separately here from the other network resources 42. Depending on the network 10, these resources include application programs 58, such as relational database tools. In particular, report generators are readily placed among the applications 58 according to the invention.

The resources 42 also include one or more driver managers 60 and corresponding driver(s) 62. Specific driver manager and driver embodiments are discussed below in connection with FIGS. 4 to 6.

To provide meaningful access to the repository 48 by database applications 58, a correspondence must be established between the information and structures in the repository 48, on the one hand, and suitable database elements and tables, on the other. Several approaches appear possible when one asks how the repository components could be mapped to suitable database elements. For instance, a database table could be used to represent the entire repository contents, to represent a class (regardless of whether the class is a container class or an effective class), to represent a container class, to represent an effective class, to represent an individual object, or to represent an individual attribute.

Moreover, different mappings are then possible for the rows and columns of tables. The possibilities grow larger still when one realizes that different tables and their various rows and columns may also be mapped to different types of repository components. That is, one table may represent a container class while another table represents an individual object. However, the various mappings provide a wide variety of capabilities, not all of equal utility, and the implications of a particular mapping are sometimes unexpected.

Figure 3:
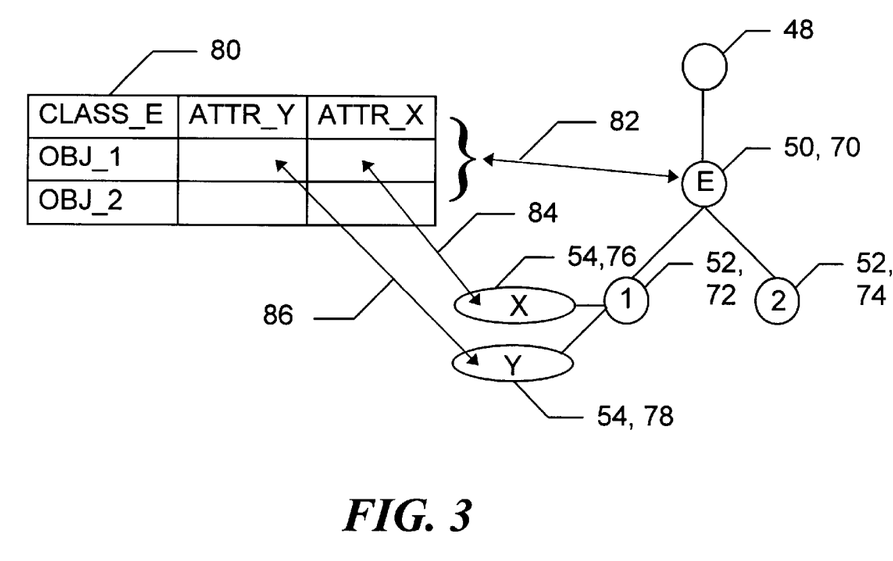
FIG. 3 is a diagram illustrating correspondences made according to the present invention between the repository shown in FIG. 2 and a relational database table.

One set of mappings according to the present invention is illustrated in FIG. 3. A simple repository 48 contains an effective class 70 and two objects 72 and 74, denoted obj__1 and obj__2, respectively. The object obj__1 has two attributes 76 and 78, denoted attr__x and attr__y, respectively. A database table 80 has four positions, arranged in two rows and two columns.

Three mappings 82–86 have been made according to the present invention. The mapping 82 creates a correspondence between the effective class 70 and the table 80, while the mappings 84 and 86 create correspondences between the attributes 76 and 78, on the one hand, and columns of the table 80, on the other.

In short, in the illustrated embodiment of the network 10 configured according to the invention, the directory services repository 48 includes the effective class 50, the relational database application 58 (FIG. 2) generates a relational database language statement identifying the table 80, and the invention maps the effective class 50 to the table 80. The repository 48 also includes the object 72, which is an instance of the effective class 70. If the relational database language statement identifies a row in the table 80, the invention maps the object 72 to the row. The repository 48 further includes the attribute 76. If the relational database language statement identifies a column of the table 80, the invention maps the attribute 76 to the column.

Those of skill in the art will appreciate that these examples can be readily extended to create mappings between other classes, objects, and/or attributes, on the one hand, and other tables, rows, and/or columns, on the other. They will also appreciate that these mappings may be embodied explicitly in configuration files or the like, or implicitly in operational instructions such as executable computer code in a suitable driver 62 (FIG. 2) and/or API 46 (FIG. 2).

Figure 4:
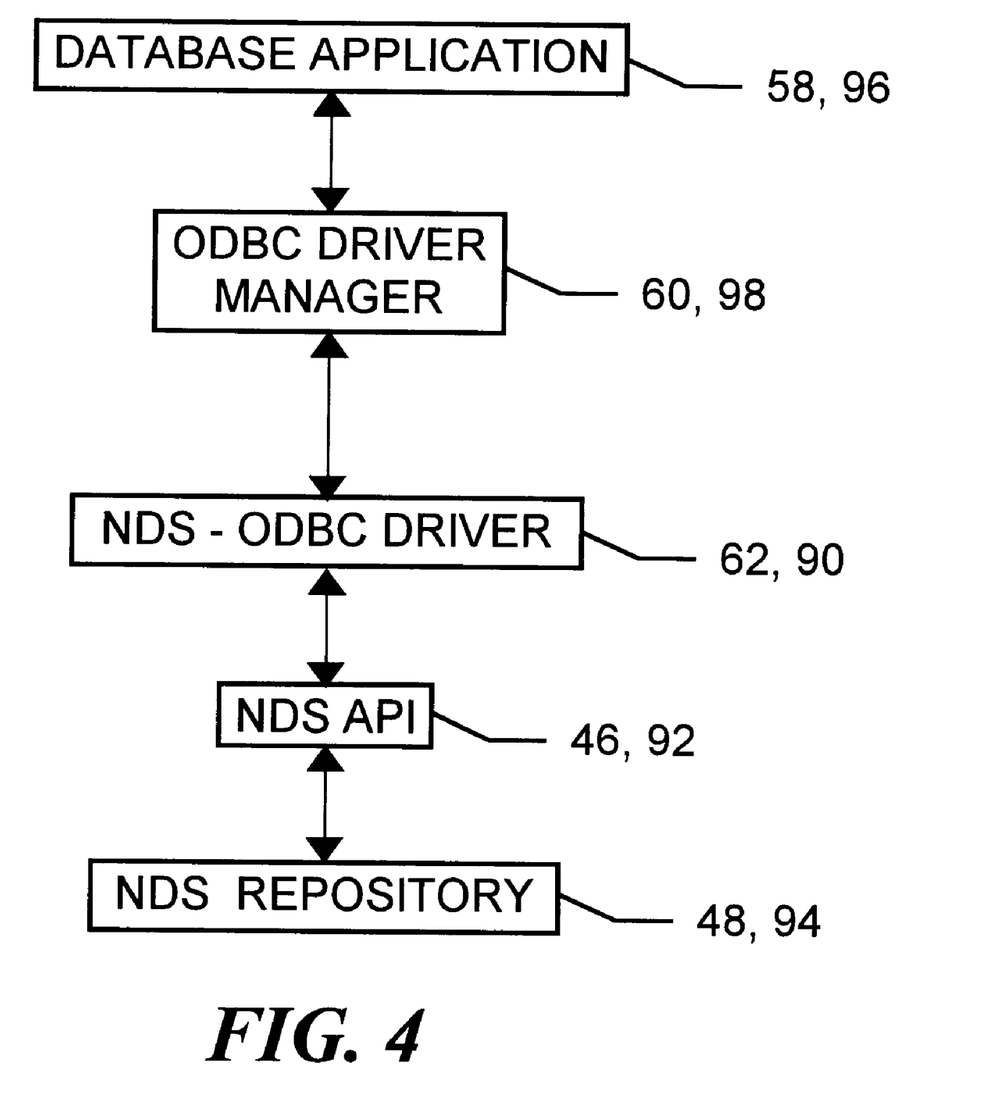
FIG. 4 is a diagram further illustrating the structure of the network configured according to the invention.

FIGS. 2 and 4 illustrate an embodiment of the invention that includes a suitable driver, indicated at 62 as a driver and also at 90 as an NDS-ODBC driver. The embodiment shown also includes callable API elements 46 in the form of an NDS API 92, and a repository 48 in the form of an NDS repository 94. An application 58, which is a relational database application 96, seeks access to the NDS repository 94. Operating system or network operating system software, such as Novell NetWare software, may help carry information between various illustrated network 10 components, such as between the NDS API 92 and the NDS repository 94.

A driver manager 60, which is an ODBC driver manager 98 such as those commercially available from Microsoft Corporation or other vendors, performs various tasks. The driver manager 60, 98 loads the NDS-ODBC driver 90 into memory for execution, passes requests from one or more database applications 96 to the NDS-ODBC driver 90 (or other drivers 62), and passes results from the drivers 62, 90 back to the requesting applications 96. The driver manager 60 functionality may be provided by an application 96, a driver 62, or an operating system component in some embodiments.

The NDS-ODBC driver 90 is capable of translating an ODBC-compliant relational database language statement into an executable NDS API sequence that includes a call to at least one callable element such as an NWDSxxx( ) function and produces an NDS API result. The driver 90 is also capable of translating the API result into a relational database result.

Those of skill in the art will appreciate how such translations are achieved by considering the following: previously available information about the NDS repository, the NDS API, other repositories, SQL, other relational database languages, ODBC, and other database standards; the sample translations herein of SQLExecDirect( ), SQLFetch( ), and other SQL calls or statements, as well as the mappings illustrated in FIG. 3, and the other teachings herein.

Figure 5:
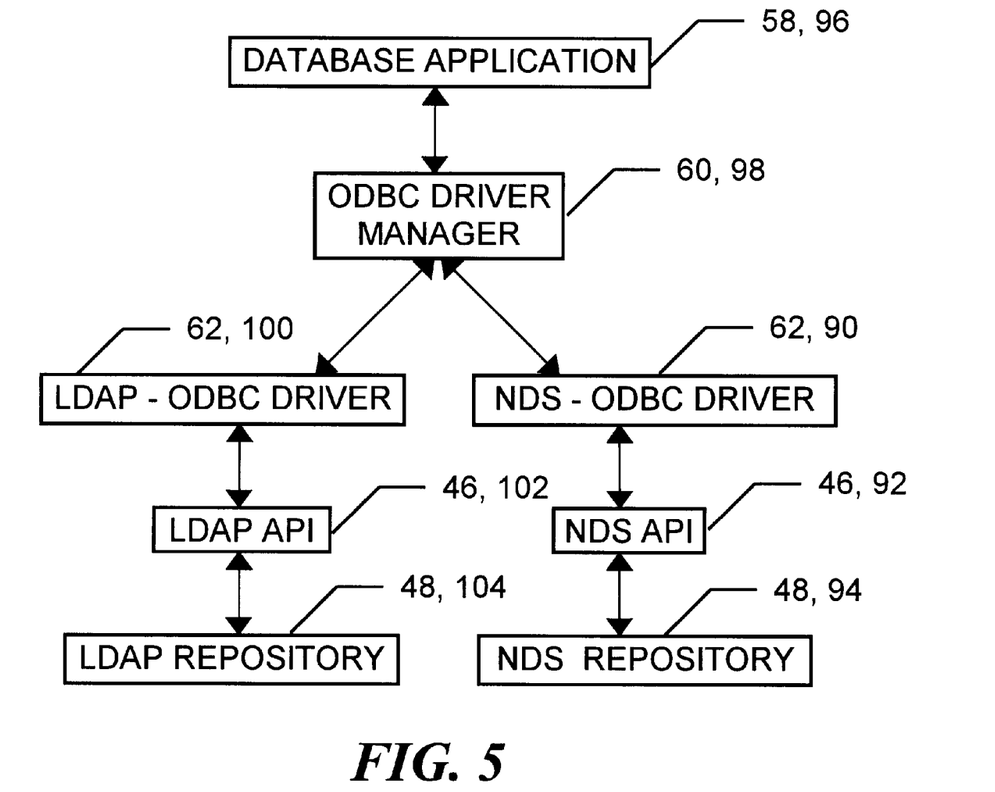
FIG. 5 is a diagram illustrating a first alternative configuration of the network according to the invention.

FIGS. 2 and 5 illustrate an alternative embodiment of the system, in which the presence of the ODBC driver manager 60, 98 is more readily justified because multiple drivers 62 are present. In addition to the components illustrated in FIG. 4, FIG. 5 includes an LDAP-ODBC driver 100, additional callable API elements 46 in the form of an LDAP API 102, and an additional repository 48 in the form of an LDAP repository 104. The LDAP repository 104 may be an NDS repository 94 or any of various X.500 repositories. The LDAP components 100, 102, and 104 provide storage and access to repository information according to the Lightweight Directory Access Protocol. Of course, a variety of X.500 repositories could be added to the network 10, either in addition to or in lieu of, the NDS repository 94.

Figure 6:
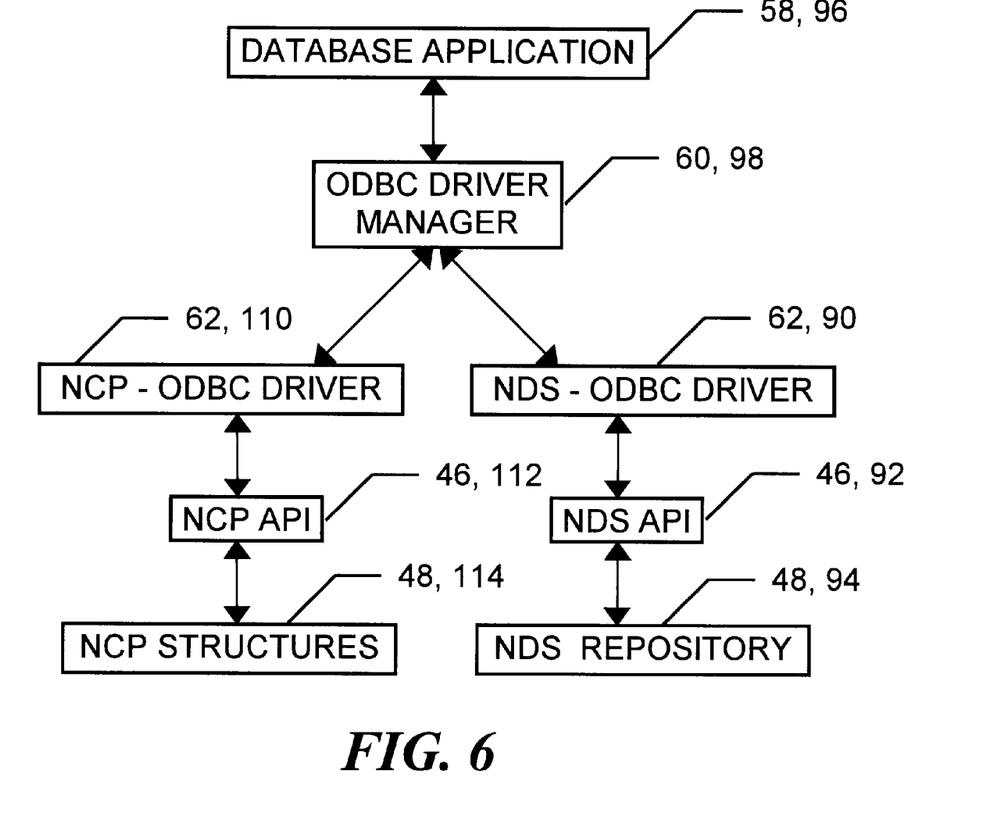
FIG. 6 is a diagram illustrating a second alternative configuration of the network according to the invention.

FIGS. 2 and 6 illustrate an alternative embodiment in which similar NetWare Core Protocol ("NCP") components 110, 112, and 114 have been added to the components shown in FIG. 4. This represents a significant extension of the invention, in that the NCP structures 114 are not stored in repository form. NCP structures are not stored as a relational database, either, so making them available through the present invention provides the network 10 with significant new functionality.

In operation, and with regard to all Figures, suppose that the database application 58 requests access to the repository 48 using standard relational database calls or a standard relational database language statement, such as an SQL statement. Then the network 10 services these requests, at least to some extent, by reinterpreting the repository 48 as if it were a database. The network may provide read-only access, or read-write access. Access may be controlled by conventional security means utilized in combination with the invention.

For instance, with the invention a SQLTables( ) call or statement may return information about the "tables" a user can access by returning corresponding information about the effective classes 50. Likewise, a SQLColumns( ) call or statement may return information about the "columns" in a table or table by returning corresponding information about the attributes 54.

Further refinements are also available in embodiments of the invention. For instance, the driver 62 may treat the number of rows of the table 80 as unknown until each object 52, if any, which is an instance of the effective class 50 that is mapped to the table 80 has been accessed. This treatment may occur in response to calls or statements such as SQLStatistics( ) which conventionally returns information about a database table but under the invention can be made to return information about a repository effective class 50. This treatment is suitable when the repository 48 (like the NDS repository) contains no indexes that could indicate the number of "rows," that is, the number of objects 52. The application program 58 could then discover the number of rows/objects by visiting each until "no more data" is returned.

More generally, the number of result rows may depend on the attribute values requested in a query. For instance, suppose the repository 48 contains a group having common name CN=One and having members A, B, and C, as well as another group having common name CN=Two and having members X, Y, and Z. Then a query "Select Member from Group" would return a column titled Member containing values A, B, C, X, Y, and Z, whereas a query "Select CN from Group" would return a column titled CN containing values One and Two.

According to another refinement, the repository 48 includes a distinguished name attribute similar or equivalent to the distinguished name attribute provided in the NDS repository 94. When a relational database language statement sent from the application 96 to the driver 62 requests identification of a column that is most efficient for repositioning to a row, the result identifies the column that is mapped to the distinguished name attribute. This provides suitable handling of the SQLSpecialColumns( ) call or statement and similar requests.

As another example of the operation of one embodiment of the invention, assume the goal is to retrieve a listing of all the Users on a corporate network 10 which includes an NDS repository 94. Using native NDS API function calls, the following steps are required:

1. Allocate the result buffer by calling NWDSAllocBuf( ). This buffer does not need to be initialized because it is a result buffer.
2. To select information for selected attributes, go to step 3. Otherwise, go to step 6.
3. Allocate the request buffer by calling NWDSAllocBuf( ).
4. Initialize the request buffer for a DSV_SEARCH operation by calling NWDSInitBuf( ).
5. Place the names of the desired attributes into the request buffer by calling NWDSPutAttrName( ) once for each attribute name.
6. To specify a search filter, go to step 7. Otherwise, go to step 11.
7. Allocate a filter expression tree by calling NWDSAllocFilter( ).
8. Place the search-filter conditions in the expression tree by calling NWDSAddFilterToken( ) once for each search token.
9. Allocate a filter buffer by calling NWDSAllocBuf( ).
10. Store the search-filter expression tree in the filter buffer by calling NWDSPutFilter( ).
11. Call NWDSSearch( ).
12. Determine the number of objects whose information is stored in the buffer by calling NWDSGetObjectCount( ).
13. Get the name of the current object in the buffer and the count of attributes associated with the object by calling NWDSGetObjectName( ).
14. Retrieve the name of the attribute and the count of values associated with the attribute by calling NWDSGetAttrName( ).
15. For each value associated with the attribute, retrieve the value by calling NWDSGetAttrVal( ).
16. Loop to step 14 until all attribute information for the object has been read.
17. Loop to step 13 until the information for all objects in the buffer has been retrieved.
18. Free the filter buffer by calling NWDSFreeBuf( ).
19. Free the request buffer by calling NWDSFreeBuf( ).
20. Free the reply buffer by calling NWDSFreeBuf( ).

To retrieve the same listing of all the Users on the network 10 according to the present invention in an embodiment capable of translating ODBC function calls into corresponding NDS API repository calls like those listed above, the following requests are made:
SQLExecDirect(hStmt,"Select 'Last Name' from Users", SQL_NTS) for (rc=SQLFetch(hStmt);
  rc==SQL_SUCCESS;
  rc=SQLFetch(hStmt))
  for (colnum =1; I<=columns; colnum++)
    SQLGetData(hStmt, colnum, . . . &value, . . . )

The SQL form of access request supported by the present invention is thus not merely compatible with existing database applications, but also more compact.

Another refinement which is present in some embodiments of the invention concerns multi-valued attributes 54. Multi-valued attributes 54 include structured attributes like the NDS Replica Pointer attribute, as well as attributes whose value may be a list, like Case Ignore List or Octet List attributes. The multiple values could be mapped to fewer table positions than there are attribute values by concatenating the values and designating a special character (which is guaranteed not to appear in the values) as a separator. Concatenation may produce a string of values, or it may produce a block of values such as a so-called BLOB (Binary Large OBject). However, concatenation is not always available, since suitable separators may not exist. Moreover, applications 58 will not necessarily be able to parse such lists or blocks in order to separate the values. In addition, columns preferably have relatively simple data types, such as numbers or strings.

It is therefore preferred to create additional rows when faced with such multi-valued attributes 54. Thus, when the attribute 54 has a plurality of simultaneous values, the driver 62 and the API 46 together may map each value to a separate row, thereby effecting a one-to-many relation.

Another refinement which is present in some embodiments of the invention concerns the interpretation of subset restrictions such as those defined by SQL "where" clauses. An object 52 in a repository 48 may have a context. For instance, the distinguished name of a user object in an NDS repository 94 specifies both a common name and a context. The invention may map the context to the database language subset restriction. For instance, if the distinguished name is "dan.at.prv.novell", the common name is "dan" and the context (CX) is "at.prv.novell." Of course, other portions such as "prv.novell" or "novell" may also define a context. Then a SQL statement such as Select * from User where CX='at.prv.novell' would result in a table containing rows corresponding to user objects in the context "at.prv.novell", since that context is mapped to the where clause subset restriction.

Additional capabilities may be provided by using columns that do not map directly to a class attribute but map instead to another identifying or informational characteristic of a directory service repository component. For instance, a column may be mapped to the context portion of a distinguished name to provide context-dependent information. A column could also be mapped to an NDS tree name, allowing an ODBC driver to address multiple trees at one time.

Likewise, a column may be mapped to the non-mnemonic internal object identifier. This object identifier is sometimes called the "object name" but should not be confused with the object's mnemonic common name. Such an internal Object Name may be helpful when joining different tables. For example, the following single SQL statement could be used to retrieve the surnames of group members:

Select Group.CN, User.CN, User.Surname
  From, User, Group
    Where "User.Object Name"=Group.Member;

In summary, the present invention provides a novel approach which makes directory service repositories accessible to relational database tools such as report generators. The invention bridges the gap between well-understood database structures and operations, on the one hand, and less familiar repository structures and operations, on the other. The invention allows a variety of mappings between the repository and a corresponding database, and provides specific mapping choices and other refinements for use in particular embodiments. The invention may be used with conventional ODBC driver managers and database tools, and without changing existing NDS, X.500 or other repositories. The invention also provides database access to non-repository information such as NCP information.

All descriptions identified herein by citing specific topics or pages in NetWare 4 are incorporated herein by reference. In the event of a conflict, descriptions provided directly herein take precedence over those incorporated by reference.

Although particular methods embodying the present invention are expressly illustrated and described herein, it will be appreciated that system and article embodiments may be formed according to methods of the present invention. Unless otherwise expressly indicated, the description herein of methods of the present invention therefore extends to corresponding system and articles, and the description of system and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system providing access to a directory services repository which is stored on a computer system, the claimed system comprising:

a directory services application programming interface, also known as the API, which includes at least one callable element that is capable of accessing a component of the directory services repository in response to being called; and   a driver which is capable of translating a relational database language statement into an executable API sequence that includes a call to the callable element and produces an API result, the driver also being capable of translating the API result into a relational database result,   wherein the directory services repository component includes an effective class and an object having a context the relational database language statement identifies a table and a subset restriction, and the driver and the API together map the effective class to the table and also map the context to the subset restriction.

2. The system of claim 1, wherein the directory services repository includes a Novell Directory Services repository and the API includes a Novell Directory Services API.

3. The system of claim 1, wherein the API includes a Lightweight Directory Access Protocol API.

4. The system of claim 1, wherein the API includes a Java Naming and Directory Interface API.

5. The system of claim 1, wherein the directory services repository includes an X.500 directory services repository and the API includes an X.500 directory services API.

6. The system of claim 1, further comprising a NetWare Core Protocol API, also known as the NCP API, wherein the driver is also capable of translating a relational database language statement into an executable NCP API sequence that includes a call to a callable element of the NCP API and produces an NCP API result, and the driver is also capable of translating the NCP API result into a relational database result.

7. The system of claim 1, wherein the relational database language statement is written in a Structured Query Language format.

8. The system of claim 1, wherein the relational database language statement conforms with at least one version of the Open Database Connectivity standard.

9. The system of claim 1, wherein the driver provides read-only access to the directory services repository.

10. The system of claim 1, wherein the driver provides read and write access to the directory services repository.

11. The system of claim 1, wherein the directory services repository component includes an object that is an instance of the effective class, the relational database language statement identifies a row in the table, and the driver and the API together map the object to the row.

12. The system of claim 1, wherein the driver and the API allow an application program to discover the number of rows of the table by visiting each object, if any, which is an instance of the effective class, until a "no more date" indication is returned because each object, if any, has been accessed.

13. The system of claim 1, wherein the directory services repository component includes an attribute, the relational database language statement identifies a column of a table, and the driver and the API together map the attribute to the column.

14. The system of claim 13, wherein the attribute has a plurality of simultaneous values, and the driver and the API together map each value to a separate row in the table, thereby presenting a one-to-many relation.

15. The system of claim 1, wherein the directory services repository component includes a distinguished name attribute, the relational database language statement requests identification of a column that is most efficient for repositioning to a row, and the driver and the API together respond to the statement by identifying the column that is mapped to the distinguished name attribute.

16. The system of claim 1, wherein the directory services repository component includes a non-mnemonic object name, the relational database language statement identifies a column of a table, and the driver and the API together map the non-mnemonic object name to the column.

17. The system of claim 1, wherein the directory services repository component includes a non-mnemonic tree name, the relational database language statement identifies a column of a table, and the driver and the API together map the non-mnemonic tree name to the column.

18. A method for providing access to a directory services repository which is stored on a server computer in a computer network, the method comprising the steps of:
    interfacing with a directory services application programming interface, also known as the API, which includes at least one callable element that is capable of accessing a component of the directory services repository in response to being called;
    providing a driver which is capable of translating a relational database language statement into an executable API sequence that includes a call to the callable element and produces an API result;
    mapping an effective class in the directory services repository to a table identified in the relational database language statement;
    mapping an object that is an instance of the effective class to a row in the table; and
    mapping a context of the object to a subset restriction in the relational database language statement; and
    requesting access to the repository by passing the relational database language statement to the driver.

19. The method of claim 18, wherein the requesting step passes a Structured Query Language statement to the driver.

20. The method of claim 18, further including the step of mapping an attribute in the directory services repository to a column of a table identified in the relational database language statement.

21. A computer storage medium having a configuration that represents data and instructions which will cause at least a portion of a computer system to perform method steps for providing access to a directory services repository which is stored on a server computer in a computer network, the method steps comprising the steps of:
    interfacing with a directory services application programming interface, also known as the API, which includes at least one callable element that is capable of accessing a component of the directory services repository in response to being called;
    providing a driver which is capable of translating a relational database language statement into an executable API sequence that includes a call to the callable element and produces an API result;
    mapping an effective class in the directory services repository to a table identified in the relational database language statement;
    mapping an object that is an instance of the effective class to a row in the table; and
    mapping a context of the object to a subset restriction in the relational database language statement; and
    requesting access to the repository by passing the relational database language statement to the driver.

22. The storage medium of claim 21, wherein the requesting step passes a Structured Query Language statement to the driver.

23. The storage medium of claim 21, wherein the method further includes the step of mapping an attribute in the directory services repository to a column of a table identified in the relational database language statement.

24. A system providing access to a directory services repository which is stored on a computer system, the claimed system comprising:
    a directory services application programming interface, also known as the API, which includes at least one callable element that is capable of accessing a component of the directory services repository in response to being called, the API including a Java Naming and Directory Interface API; and
    a driver which is capable of translating a relational database language statement into an executable API sequence that includes a call to the callable element and produces an API result, the driver also being capable of translating the API result into a relational database results,
    wherein the directory services repository component includes an effective class and an object having a context the relational database language statement identifies a table and a subset restriction, and the driver and the API together map the effective class to the table and also map the context to the subset restriction.

25. The system of claim 24, wherein the directory services repository includes a Novell Directory Services repository and the API includes a Novell Directory Services API.

26. The system of claim 24, wherein the API includes a Lightweight Directory Access Protocol API.

27. The system of claim 24, wherein the directory services repository includes an X.500 directory services repository and the API includes an X.500 directory services API.

28. The system of claim 24, further comprising a NetWare Core Protocol API, also known as the NCP API, wherein the driver is also capable of translating a relational database language statement into an executable NCP API sequence that includes a call to a callable element of the NCP API and produces an NCP API result, and the driver is also capable of translating the NCP API result into a relational database result.

29. The system of claim 24, wherein the relational database language statement is written in a Structured Query Language format.

30. The system of claim 24, wherein the relational database language statement conforms with at least one version of the Open Database Connectivity standard.

31. The system of claim 24, wherein the driver provides read-only access to the directory services repository.

32. The system of claim 24, wherein the driver provides read and write access to the directory services repository.

33. The system of claim 24, wherein the directory services repository component includes an object that is an instance of the effective class, the relational database language statement identifies a row in the table, and the driver and the API together map the object to the row.

34. The system of claim 24, wherein the driver and the API allow an application program to discover the number of rows of the table by visiting each object, if any, which is an instance of the effective class, until a "no more data" indication is returned because each object, if any, has been accessed.

35. The system of claim 24, wherein the directory services repository component includes an attribute, the relational database language statement identifies a column of a table, and the driver and the API together map the attribute to the column.

36. The system of claim 35, wherein the attribute has a plurality of simultaneous values, and the driver and the API together map each value to a separate row in the table, thereby presenting a one-to-many relation.

37. The system of claim 24, wherein the directory services repository component includes a distinguished name attribute, the relational database language statement requests identification of a column that is most efficient for repositioning to a row, and the driver and the API together respond to the statement by identifying the column that is mapped to the distinguished name attribute.

38. The system of claim 24, wherein the directory services repository component includes a non-mnemonic object name, the relational database language statement identifies a column of a table, and the driver and the API together map the nonmnemonic object name to the column.

39. The system of claim 24, wherein the directory services repository component includes a non-mnemonic tree name, the relational database language statement identifies a column of a table, and the driver and the API together map the non-mnemonic tree name to the column.

40. The system of claim 28, wherein the directory services repository includes a Novell Directory Services repository and the API includes a Novell Directory Services API.

41. The system of claim 28, wherein the API includes a Lightweight Directory Access Protocol API.

42. The system of claim 28, wherein the directory services repository includes an X.500 directory services repository and the API includes an X.500 directory services API.

43. The system of claim 28, wherein the relational database language statement is written in a Structured Query Language format.

44. The system of claim 28, wherein the relational database language statement conforms with at least one version of the Open Database Connectivity standard.

45. The system of claim 28, wherein the driver provides read-only access to the directory services repository.

46. The system of claim 28, wherein the driver provides read and write access to the directory services repository.

47. The system of claim 28, wherein the directory services repository component includes an effective class, the relational database language statement identifies a table, and the drive and API together map the effective class to the table.

48. The system of claim 47, wherein the directory services repository component inlcudes an object that is an instance of the effective class, the relational database language statement identifies a row in the table, and the driver and the API together map the object to the row.

49. The system of claim 47, wherein the driver and the API allow an application program to discover the number of rows of the table by visiting each object, if any, which is an instance of the effective class, until a "no more data" indication is returned because each object, if any, has been accessed.

50. The system of claim 47, wherein the directory services repository component includes an object having a context, the relational database language statement identifies a subset restriction, and the driver and the API together map the context to the subset restriction.

51. The system of claim 28, wherein the directory services repository component includes an attribute, the relational database language statement identifies a column of a table, and the drive and the API together map the attribute to the column.

52. The system of claim 51, wherein the attribute has a plurality of simultaneous values, and the driver and the API together map each value to a separate row in the table, thereby presenting a one-to-many relation.

53. The system of claim 28, wherein the directory services repository component includes a distinguished name attribute, the relational database language statement requests identification of a column that is most efficient for repositioning to a row, and the driver and the API together respond to the statement by identifying the column that is mapped to the distinguished name attribute.

54. The system of claim 28, wherein the directory services repository component includes a non-mnemonic object name, the relational database language statement identifies a column of a table, and the driver and the API together map the non-mnemonic object name to the column.

55. The system of claim 28, wherein the directory services repository component includes a non-mnemonic tree name, the relational database language statement identifies a column of a table, and the driver and the API together map the non-mnemonic tree name to the column.

56. A system providing access to a directory services repository which is stored on a computer system, the claimed system comprising:

a directory services application programming interface, also known as the API, which includes at least one callable element that is capable of accessing a component of the directory services repository in response to being called; and a driver which is capable of translating a relational database language statement into an executable API sequence that includes a call to the callable element and produces an API result, the driver also being capable of translating the API result into a relational database result, wherein the directory services repository component includes an attribute which has a plurality of simultaneous values, the relational database language statement identifies a column of a table, the driver and the API together map the attribute to the column, and the driver and the API together map each value of the attribute to a separate row in the table, thereby presenting a one-to-many relation.

57. The system of claim 56, wherein the directory services repository includes a Novell Directory Services repository and the API includes a Novell Directory Services API.

58. The system of claim 56, wherein the API includes a Lightweight Directory Access Protocol API.

59. The system of claim 56, wherein the directory services repository includes an X.500 directory services repository and the API includes an X.500 directory services API.

60. The system of claim 56, wherein the relational database language statement is written in a Structured Query Language format.

61. The system of claim 56, wherein the relational database language statement conforms with at least one version of the Open Database Connectivity standard.

62. The system of claim 56, wherein the driver provides read-only access to the directory services repository.

63. The system of claim 56, wherein the driver provides read and write access to the directory services repository.

64. The system of claim 56, wherein the directory services repository component includes an effective class, the relational database language statement identifies a table, and the driver and the API together map the effective class to the table.

65. The system of claim 64, wherein the directory services repository component includes an object that is an instance of the effective class, the relational database language statement identifies a row in the table, and the driver and the API together map the object to the row.

66. The system of claim 64, wherein the driver and the API allow an application program to discover the number of rows of the table by visiting each object, if any, which is an instance of the effective class, until a "no more data" indication is returned because each object, if any, has been accessed.

67. The system of claim 56, wherein the directory services repository component includes a distinguished name attribute, the relational database language statement requests identification of a column that is most efficient for repositioning to a row, and the driver and the API together respond to the statement by identifying the column that is mapped to the distinguished name attribute.

68. The system of claim 56, wherein the directory services repository component includes a non-mnemonic object name, the relational database language statement identifies a column of a table, and the driver and the API together map the nonmnemonic object name to the column.

69. The system of claim 56, wherein the directory services repository component includes a non-mnemonic tree name, the relational database language statement identifies a column of a table, and the driver and the API together map the non-mnemonic tree name to the column.

* * * * *

UNITED STATES PATENT AND TRADEMARK OFFICE
CERTIFICATE OF CORRECTION

PATENT NO.   : 6,016,499
DATED        : January 18, 2000
INVENTOR(S)  : Daniel T. Ferguson Page 1 of 1

It is certified that error appears in the above-identified patent and that said Letters Patent is hereby corrected as shown below:

<u>Title page,</u>
Item [54], In the title, please delete the word "RESPOSITORY" and insert instead -- REPOSITORY --.

Signed and Sealed this

Nineteenth Day of March, 2002

Attest:

JAMES E. ROGAN
*Director of the United States Patent and Trademark Office*

*Attesting Officer*